(12) United States Patent
Nakahara (10) Patent No.: US 11,242,088 B2
(45) Date of Patent: Feb. 8, 2022

(54) LANE DEPARTURE AVOIDANCE SYSTEM

(71) Applicant: DENSO CORPORATION, Kariya (JP)

(72) Inventor: Naoto Nakahara, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/740,317

(22) PCT Filed: Jun. 28, 2016

(86) PCT No.: PCT/JP2016/069148
§ 371 (c)(1),
(2) Date: Dec. 27, 2017

(87) PCT Pub. No.: WO2017/002811
PCT Pub. Date: Jan. 5, 2017

(65) Prior Publication Data
US 2018/0186405 A1    Jul. 5, 2018

(30) Foreign Application Priority Data
Jun. 29, 2015 (JP) .............................. JP2015-130161

(51) Int. Cl.
| B62D 15/02 | (2006.01) |
| G06K 9/00 | (2006.01) |
| B62D 6/00 | (2006.01) |
| B60R 21/00 | (2006.01) |
| B60W 30/12 | (2020.01) |
| B62D 5/04 | (2006.01) |
| G08G 1/16 | (2006.01) |

(52) U.S. Cl.
CPC ............ *B62D 15/025* (2013.01); *B60R 21/00* (2013.01); *B60W 30/12* (2013.01); *B62D 5/046* (2013.01);
(Continued)

(58) Field of Classification Search
CPC ........ B62D 15/025; B62D 6/003; B62D 6/00; B62D 5/046; B60W 30/12; G06K 9/00798; G08G 1/167
(Continued)

(56) References Cited

U.S. PATENT DOCUMENTS 6,973,380 B2 * 12/2005 Tange ................ B60K 31/0066
                                                        340/436
7,860,652 B2 * 12/2010 Nishida ..................... G06T 7/12
                                                        701/514
(Continued)

FOREIGN PATENT DOCUMENTS

JP    2000-272498        10/2000
JP    2003-175848 A      6/2003
(Continued)

*Primary Examiner* — Isaac G Smith
(74) *Attorney, Agent, or Firm* — Maschoff Brennan (57) ABSTRACT

A lane departure avoidance system disables start of steering control or terminate running steering control upon determination that a value of a at least one selected variation, which is selected from a first variation, a second variation, a third variation, and a fourth variation, is equal to or more than a corresponding threshold. The first variation is a variation of a lateral position of an own vehicle relative to lane marking lines recognized by a recognition unit, and the second variation is a variation of a yaw angle of the own vehicle relative to the recognized lane marking lines. The third variation is a variation of a curvature of the recognized lane marking lines, and the fourth variation is a variation of a pitch angle of the own vehicle.

5 Claims, 11 Drawing Sheets

(52) U.S. Cl.
CPC ........... *B62D 6/00* (2013.01); *G06K 9/00798* (2013.01); *G08G 1/167* (2013.01); *B60W 2420/42* (2013.01); *B60W 2552/00* (2020.02); *B60Y 2300/12* (2013.01); *B60Y 2400/303* (2013.01); *B60Y 2400/3015* (2013.01); *B60Y 2400/83* (2013.01)

(58) Field of Classification Search
USPC ....................................................... 701/41, 1
See application file for complete search history.

(56) References Cited

U.S. PATENT DOCUMENTS

| | | | | |
|---|---|---|---|---|
| 2011/0010021 | A1* | 1/2011 | Kobayashi | B62D 15/025 701/1 |
| 2012/0283912 | A1* | 11/2012 | Lee | B62D 1/286 701/41 |
| 2015/0210318 | A1* | 7/2015 | Takeda | B62D 6/003 701/41 |
| 2016/0052546 | A1 | 2/2016 | Arakane et al. | |

FOREIGN PATENT DOCUMENTS

| | | |
|---|---|---|
| JP | 2005-343305 A | 12/2005 |
| JP | 3882304 B2 | 2/2007 |
| JP | 2007-076508 | 3/2007 |
| JP | 2007-314174 | 12/2007 |
| JP | 2009-035214 | 2/2009 |
| WO | WO 2014-155893 | 10/2014 |

* cited by examiner

LANE DEPARTURE AVOIDANCE SYSTEM

CROSS-REFERENCE TO RELATED APPLICATIONS

This application is a U.S. National Phase Application of PCT International Application No. PCT/JP2016/069148, filed on Jun. 28, 2016, designating the United States of America and published in the Japanese language, which is an International Application of and claims the benefit of priority to Japanese Patent Application No. 2015-130161, filed on Jun. 29, 2015. The disclosures of the above-referenced applications are hereby expressly incorporated by reference in their entireties.

TECHNICAL FIELD

The present disclosure relates to lane departure avoidance systems.

BACKGROUND ART

A known lane departure avoidance system performs the following steering control. Specifically, such a lane departure avoidance system captures a region in front of an own vehicle using an in-vehicle camera to thereby obtain an image ahead of the own vehicle. Next, the lane departure avoidance system recognizes lane marking lines in the captured image. Then, the lane departure avoidance system steers, based on the location of the own vehicle relative to the recognized lane marking lines, the own vehicle toward a direction in which the lane departure is avoided (see patent literature 1).

CITATION LIST

Patent Literature

Japanese Patent Publication No. 3882304

SUMMARY

Technical Problem

If the lane marking lines on a road become light-colored or the road conditions are poor, the recognized results of the lane marking lines by the lane departure avoidance system may be unreliable. If the lane departure avoidance system performs the above steering control based on such unreliable recognized results of the lane marking lines, the steering control may be unstable.

In view of such an issue, the present disclosure seeks to provide lane departure avoidance systems, each of which is capable of maintaining stable steering control.

A lane departure avoidance system according to an exemplary aspect of the present disclosure includes an image obtaining unit configured to obtain a captured image of a forward region ahead of an own vehicle, and a recognition unit configured to recognize lane marking lines in the captured image. The lane departure avoidance system includes a control execution unit configured to execute, based on a position of the own vehicle relative to the lane marking lines recognized by the recognition unit, steering control to thereby steer the own vehicle toward a direction for avoiding departure of the own vehicle from a lane. The lane departure avoidance system includes a calculation unit configured to calculate at least one selected variation that is selected from a first variation, a second variation, a third variation, and a fourth variation. The first variation is a variation of a lateral position of the own vehicle relative to the recognized lane marking lines, the second variation is a variation of a yaw angle of the own vehicle relative to the recognized lane marking lines, the third variation is a variation of a curvature of the recognized lane marking lines, and the fourth variation is a variation of a pitch angle of the own vehicle. The lane departure avoidance system includes a determination unit configured to determine whether a value of the selected variation is equal to or more than a corresponding threshold. The lane departure avoidance system includes a control restriction unit configured to disable start of the steering control or terminate the running steering control upon determination that the value of the selected variation is equal to or more than the corresponding threshold.

A state where the value of the selected variation is equal to or more than the threshold represents that the recognized result of the lane marking lines is unstable. Because the steering control is carried out based on the recognized result of the lane marking lines, executing the steering control while the recognized result of the lane marking lines is unstable may result in the steering control being unstable.

The lane departure avoidance system according to the exemplary aspect is configured to disable start of the steering control or terminate the running steering control upon the value of the selected variation being equal to or more than the corresponding threshold. This configuration prevents the steering control from becoming unstable.

DESCRIPTION OF THE EMBODIMENTS

The following describes embodiments of the present disclosure with reference to the accompanying drawings. In the embodiments, like reference characters are assigned to like or identical parts between the embodiments, so that the descriptions for one of the like or identical parts are applied to another of the like or identical parts.

1. Structure of a Lane Departure Avoidance System 1

Figure 1:
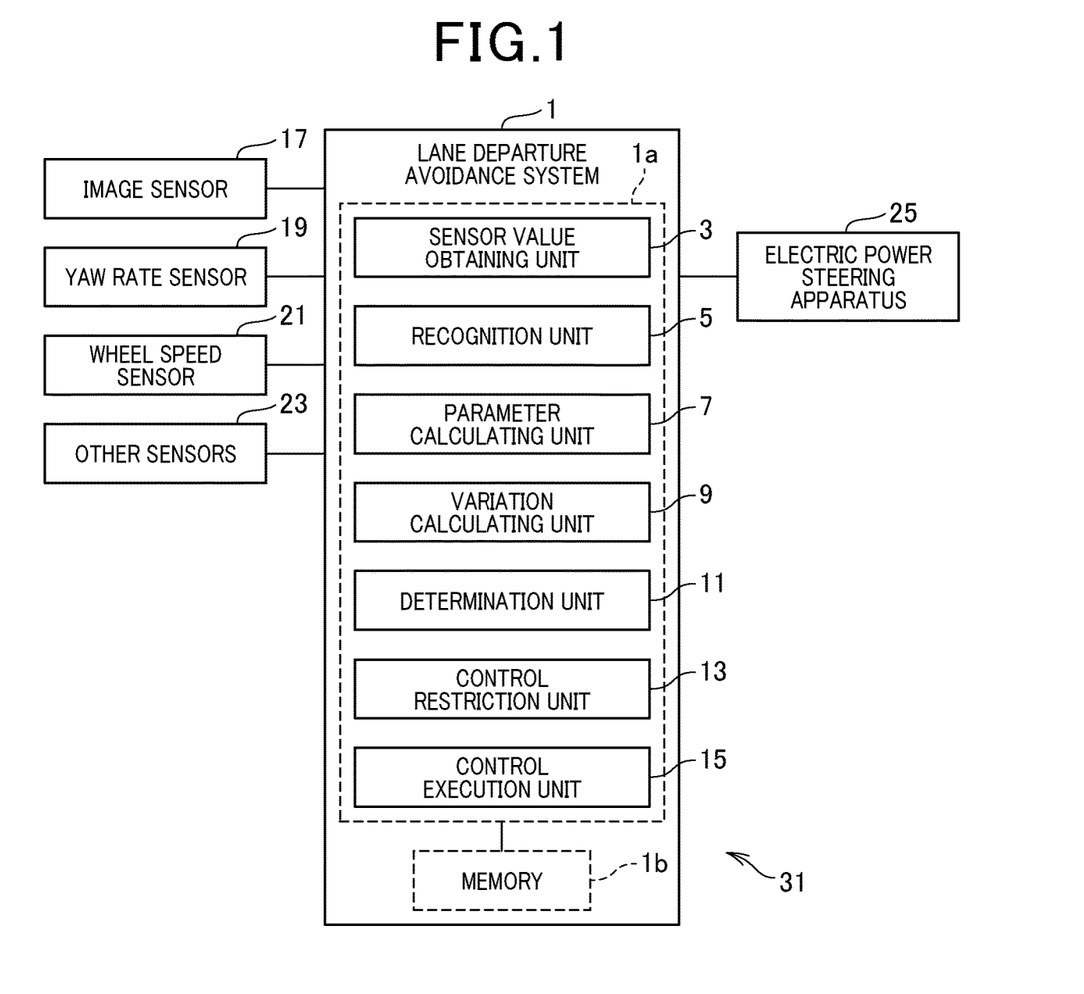
FIG. 1 is a block diagram illustrating a schematic structure of a lane departure avoidance system according to an embodiment of the present disclosure.

The following describes the structure of a lane departure avoidance system 1 with reference to FIG. 1. The lane departure avoidance system 1 is an in-vehicle system installable in a vehicle. Hereinafter, a vehicle 31 in which the lane departure avoidance system 1 is installed will be referred to as an own vehicle 31.

The lane departure avoidance system 1 is constructed mainly by a computer including a central processing unit (CPU) 1a and a memory 1b including at least one of storage media including a RAM and a ROM. The lane departure avoidance system 1, i.e. the CPU 1a, performs a lane departure avoidance routine described later in accordance with a program stored in the memory 1b.

The lane departure avoidance system 1 includes, as functions implemented by the CPU 1a, a sensor value obtaining unit 3, a recognition unit 5, a parameter calculating unit 7, a variation calculating unit 9, a determination unit 11, a control restriction unit 13, and a control execution unit 15. The functions of the respective units will be described later.

The own vehicle 31 is equipped with, in addition to the lane departure avoidance system 1, an image sensor 17, a yaw-rate sensor 19, a wheel speed sensor 21, other in-vehicle sensors 23, and an electric power steering apparatus 25.

The image sensor 17 captures a forward region ahead of the own vehicle 31, and generates image data based on the forward image.

The yaw-rate sensor 19 measures a value of the yaw rate of the own vehicle 31.

The wheel speed sensor 21 measures a value of the vehicle speed S of the own vehicle 31.

The other in-vehicle sensors 23 are each configured to measure a state quantity of the own vehicle 31.

The electric power steering apparatus 25 includes a normal function of assisting a driver's steering operation. In addition to the normal function, the electric power steering apparatus 25 also includes a function of obtaining request torque from the lane departure avoidance system 1 and of performing, based on the request torque, automatic steering of the own vehicle 31 toward a direction for avoiding the lane departure. Note that the sensor value obtaining unit 3 is an example of an image obtaining unit.

2. Lane Departure Avoidance Routine Carried Out by Lane Departure Avoidance System 1

The following describes a lane departure avoidance routine carried out by the lane departure avoidance system 1, i.e. the CPU 1a, every predetermined period with reference to FIGS. 2 to 13.

Figure 2:
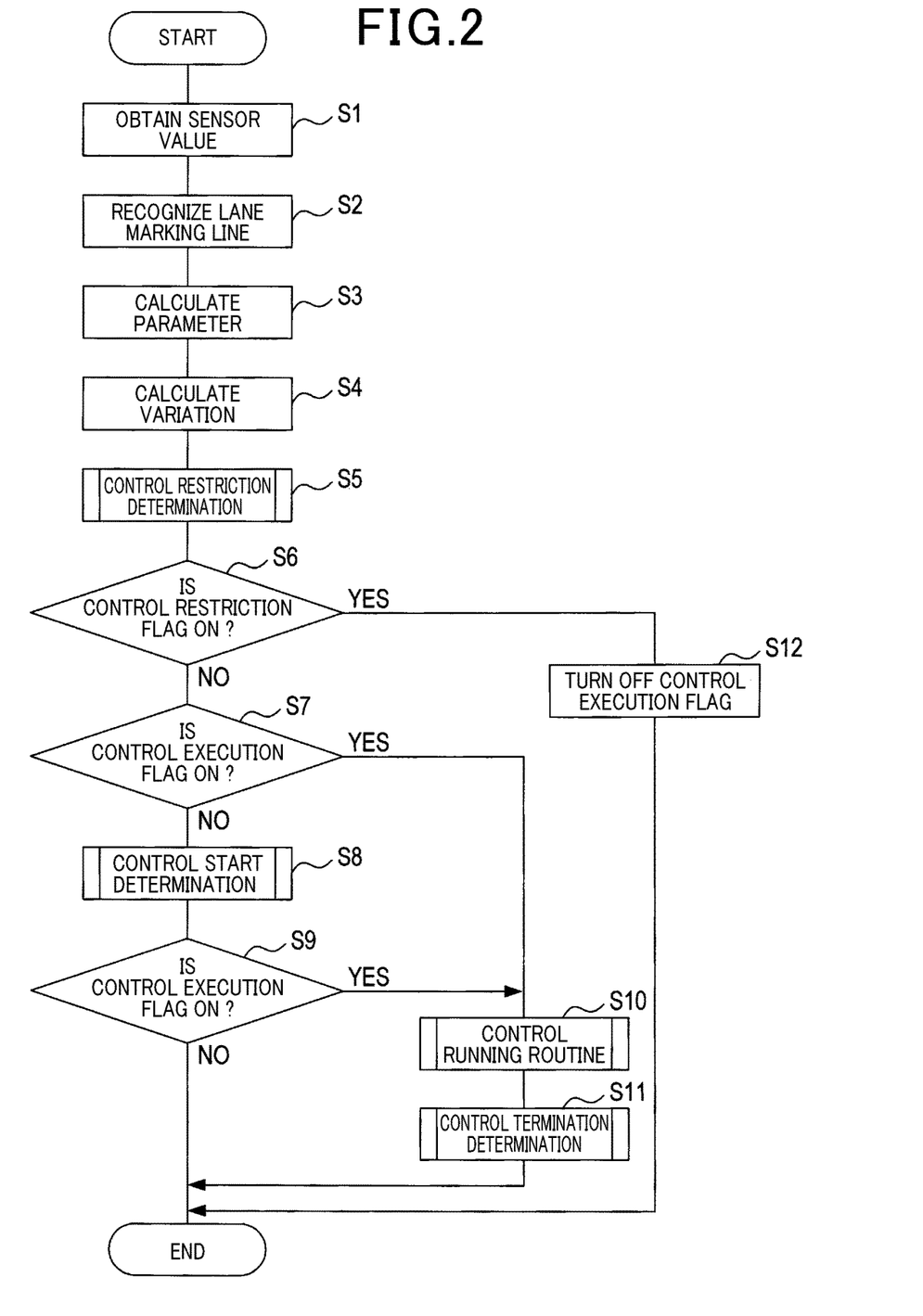
FIG. 2 is a flowchart illustrating the overall lane departure avoidance routine carried out by the lane departure avoidance system illustrated in FIG. 1.

In step S1 of FIG. 2, the sensor value obtaining unit 3 obtains sensor values or measurement values measured by the respective sensors 17, 19, 21, and 23. Specifically, the sensor value obtaining unit 3 obtains the forward image of the own vehicle 31 from the image sensor 17, and obtains, from the yaw rate sensor 19, the yaw rate of the own vehicle 31 measured by the yaw rate sensor 19. The sensor value obtaining unit 3 also obtains, from the wheel speed sensor 21, the vehicle speed S of the own vehicle 31 measured by the wheel speed sensor 21, and obtains the various state quantities of the own vehicle 31 from the other in-vehicle sensors 23.

Figure 3:
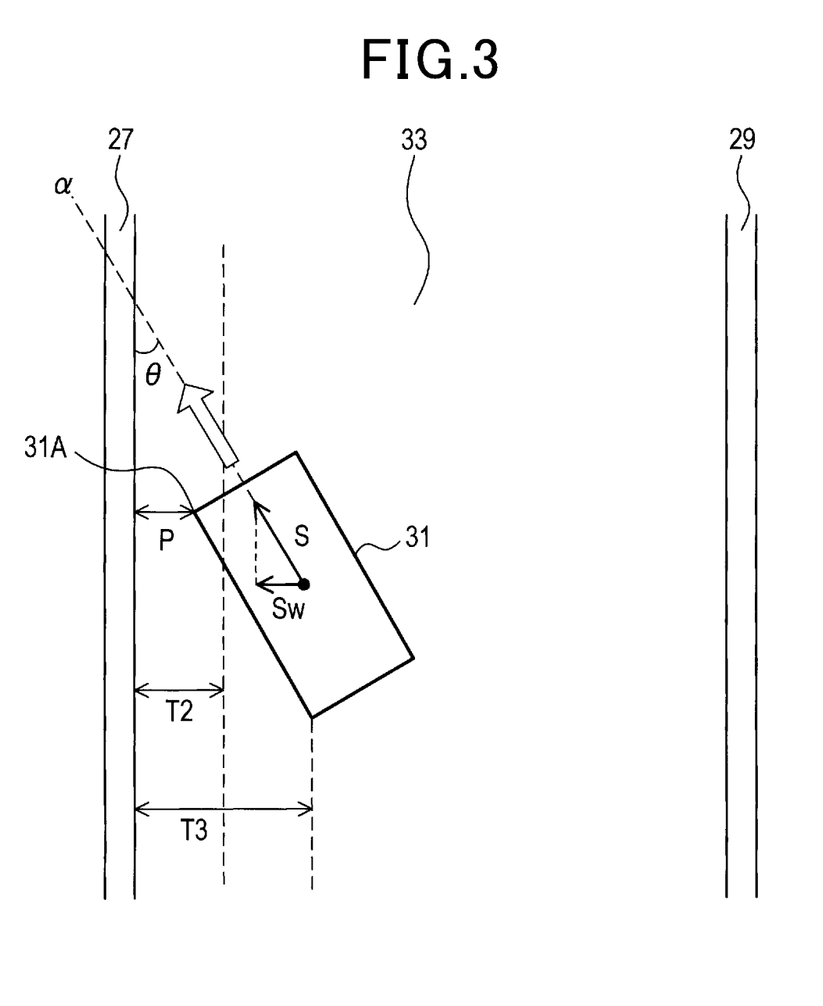
FIG. 3 is a plan view illustrating parameters including a lateral position of an own vehicle, a lateral speed of the own vehicle, and a yaw angle of the own vehicle.

In step S2, the recognition unit 5 recognizes lane marking lines in the image obtained in step S1 using a known image recognition process. As illustrated in FIG. 3, the lane marking lines 27 and 29 are lines that partition a lane 33 on which the own vehicle 31 is travelling.

In step S3, the parameter calculating unit 7 calculates, based on the sensor values obtained in step S1 and the lane marking lines 27 and 29 recognized in step S2, the following parameters representing the positional relationships of the own vehicle 31 relative to the lane marking lines 27 and 29:

1. A lateral position P of the own vehicle 31
2. A yaw angle $\theta$
3. A lateral speed Sw
4. A curvature C of the travelling line 33
5. A pitch angle $\Phi$ of the own vehicle 31

Then, the parameter calculating unit 7 stores the parameters in the memory 1b.

Referring to FIG. 3, the lateral position P represents a distance, in the lateral direction, between (1) One of the lane marking lines 27 and 29, such as the lane marking line 27 in FIG. 3, which is closer to the own vehicle 31 than the other is (2) A portion 31A of the own vehicle 31, which is the closest to the closer lane marking line The lateral direction represents a direction perpendicular to the extending direction of the lane 33, i.e. a vehicle width direction.

Note that, as illustrated in FIG. 3, when the portion 31A is located in the lane 33, i.e. the portion 31A is located to be on the right side of the lane marking line 27, the lateral position P takes a positive value. In contrast, when the portion 31A is located outside the lane 33, i.e. the portion 31A is located to be on the left side of the lane marking line 27, the lateral position P takes a negative value.

Specifically, the parameter calculating unit 7 calculates the lateral position P of the own vehicle 31 in accordance with the recognized positions of the lane marking lines 27 and 29 in the image obtained in step S1

Referring to FIG. 3, the yaw angle $\theta$ represents an angle formed by the travelling direction $\alpha$ of the own vehicle 31 and the lane marking line 27 or 29.

The parameter calculating unit 7 calculates the yaw angle $\theta$ of the own vehicle 31 in accordance with the positions and orientations of the lane marking lines 27 and 29, which were recognized in step S2, in the image obtained in step S1.

Note that change in the yaw angle $\theta$ causes the positions and orientations of the lane marking lines 27 and 29 in the image obtained in step S1. The parameter calculating unit 7 has stored beforehand a map defining the relationships between the yaw angle $\theta$ of the own vehicle 31 and the position and orientation of each of the lane marking lines 27 and 29. When inputting the position and orientation of each of the lane marking lines 27 and 29 to the map, the parameter calculating unit 7 correspondingly calculates the yaw angle $\theta$ of the own vehicle 31.

Referring to FIG. 3, the lateral speed Sw is a component of the vehicle speed S of the own vehicle 31 in the lateral direction of the lane 33. The parameter calculating unit 7 multiplies sin θ to the vehicle speed S of the own vehicle 31 to thereby calculate the lateral speed Sw. As to the positive or negative polarity of the lateral speed Sw, the lateral speed Sw directed to one of the lane marking lines 27 and 29, which is closer to the own vehicle 31 (lane marking line 27 in FIG. 3) than the other is, is positive. In contrast, the lateral speed Sw directed to the other of the lane marking lines 27 and 29 is negative.

The curvature C is defined as the curvature of each of the lane marking lines 27 and 29, i.e. the curvature of the lane 33, when viewed from above. The parameter calculating unit 7 estimates the curvature C in accordance with the shape of each of the lane marking lines 27 and 29 shown in the image obtained in step S1. Note that, as the positive or negative polarity of the curvature C, the curvature C is positive when the lane 33 is curved leftward as the lane 33 goes above in FIG. 3, and the curvature C is negative when the lane 33 is curved rightward as the lane 33 goes above in FIG. 3.

The pitch angle Φ of the own vehicle 31, i.e. the rotational angle to the vertical direction about the horizontal direction as the axis, can be calculated based on the position of each of the lane marking lines in the image obtained in step S1. Change in the pitch angle Φ causes the position of each of the lane marking lines 27 and 29 in the vertical direction in the images obtained in step S1 to change.

The parameter calculating unit 7 has stored beforehand a map defining the relationships between the pitch angle Φ of the own vehicle 31 and the positions of each of the lane marking lines 27 and 29 in the vertical direction collected from many forward images of the own vehicle 31. When inputting the position of each of the lane marking lines 27 and 29 in the vertical direction to the map, the pitch angle Φ of the own vehicle 31 is correspondingly calculated.

Returning to FIG. 2, in step S4, the variation calculating unit 9 calculates, based on the parameters calculated in step S3, the following parameter variations v1, v2, v3, v4a, and v4b, referred to simply as variations:

1. v1 represents a variation of the lateral position P
2. v2 represents a variation of the yaw angle θ
3. v3 represents a variation of the curvature C
4. v4a represents a first variation of the pitch angle Φ
5. v4b represents a second variation of the pitch angle Φ

Each of the variations v1, v2, v3, v4a, and v4b is a part of variations V. That is, there are two or more variations V.

The variations v1 to v3 and the second variation v4b each have the following meaning.

As described above, the routine illustrated in FIG. 2 is carried out every predetermined period. For this reason, the parameters including the lateral position P, the yaw angle θ, the curvature C, and the pitch angle Φ, are calculated every predetermined period by the operation in step S3 by the parameter calculating unit 7. An absolute value of the difference between a value of a parameter calculated at a point in time and a value of the same parameter calculated at the previous time is defined as X. The variation calculating unit 9 repeatedly obtains the absolute value X of the difference of a parameter at predetermined time intervals, and calculates the average of the obtained absolute values X as a variation of the parameter.

For example, the lateral positions P1, P2, P3, P4, ..., Pn are obtained within a predetermined duration where n is an integer equal to or more than 2.

The variation calculating unit 9 calculates an absolute value X12 of the difference between the lateral positions P1 and P2, an absolute value X23 of the difference between the lateral positions P2 and P3, an absolute value X34 of the difference between the lateral positions P3 and P4, ..., and an absolute value X(n−1)n of the difference between the lateral positions Pn−1 and Pn. The variation calculating unit 9 calculates the average value of the values X12, X23, X34, ..., X(n−1)n as the variation v1 of the lateral position P.

The first variation v4a is a value obtained by integrating the absolute values of the pitch angle Φ obtained during a predetermined duration.

Next, in step S5, the determination unit 11 performs a determination routine to determine whether to restrict steering control of the own vehicle 31. The following describes the determination routine with reference to FIG. 4.

Figure 4:
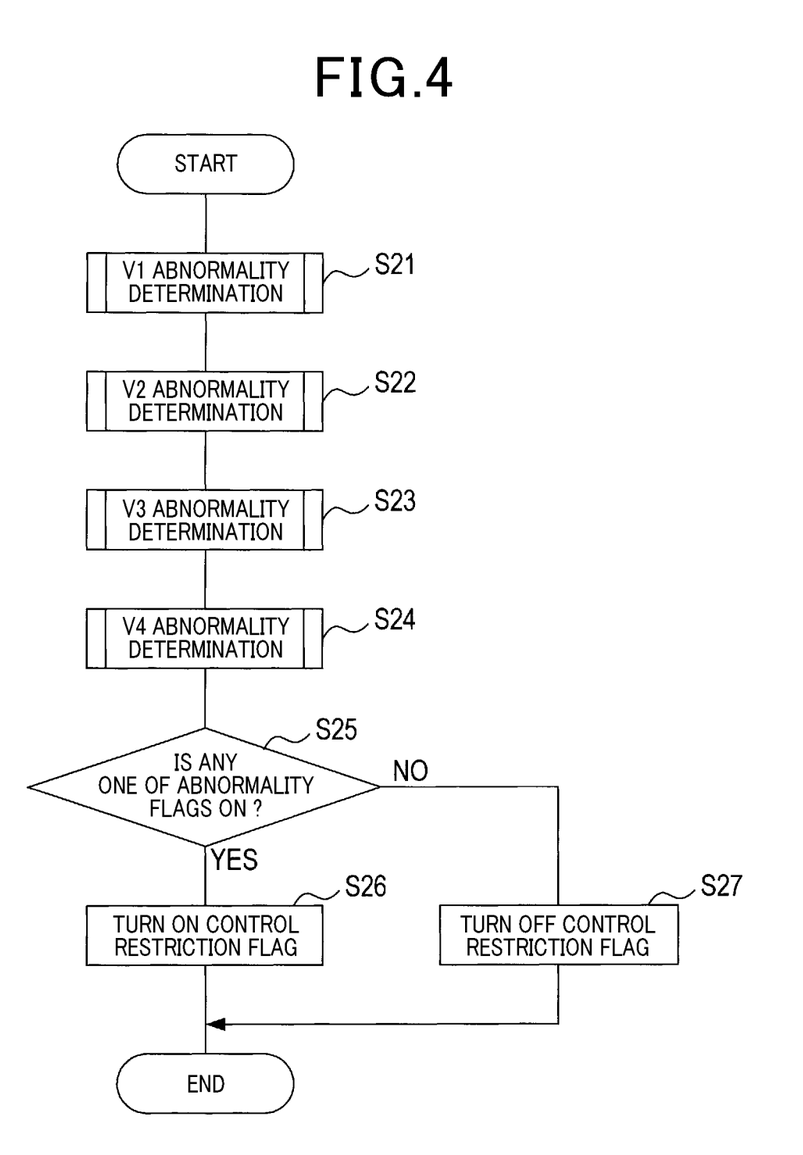
FIG. 4 is a flowchart illustrating a control restriction determination routine carried out by the lane departure avoidance system illustrated in FIG. 1.
Figure 5:
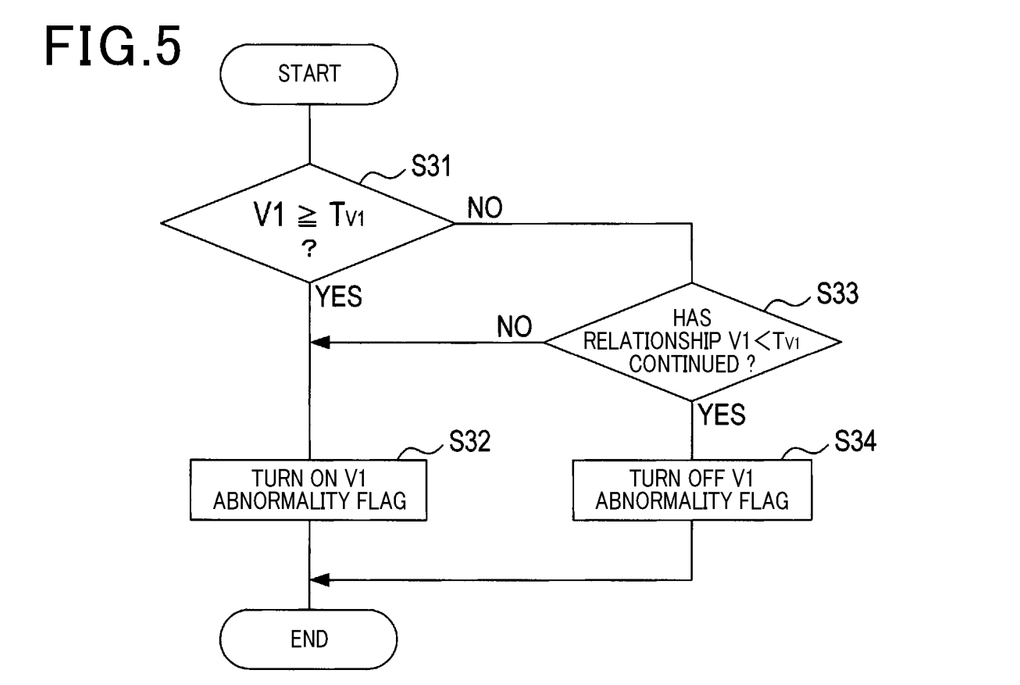
FIG. 5 is a flowchart illustrating a first abnormality determination subroutine carried out by the lane departure avoidance system illustrated in FIG. 1.

In step S21 of FIG. 4, the determination unit 11 performs a first abnormality determination subroutine illustrated in FIG. 5.

In step S31 of FIG. 5, the determination unit 11 determines whether the variation v1 is equal to or more than a predetermined threshold Tv1. Upon determination that the variation v1 is equal to or more than the threshold Tv1, the first abnormality determination subroutine proceeds to step S32. Otherwise, upon determination that the variation v1 is less than the threshold Tv1, the first abnormality determination subroutine proceeds to step S33.

In step S32, the determination unit 11 turns on a first abnormality flag. Note that v1 abnormality flag is a variable indicative of, for example, whether there is an abnormality in the variation v1, and an initial value of the v1 abnormality flag is set to an off state. If the v1 abnormality flag has been on, the determination unit 11 maintains the v1 abnormality flag in the on state.

Upon negative determination in step S31, the determination unit 11 determines whether the state where the variation v1 is less than the threshold Tv1 has continued for a predetermined time and over in step S33. Upon determination that the state where the variation v1 is less than the threshold T has continued for the predetermined time and over, the first abnormality determination subroutine proceeds to step S34. Otherwise, upon determination that the state where the variation v1 is less than the threshold Tv1 has not continued for the predetermined time and over, the first abnormality determination subroutine proceeds to step S32.

In step S34, the determination unit 11 turns off the v1 abnormality flag. If the v1 abnormality flag has been off, the determination unit 11 maintains the v1 abnormality flag in the off state.

Figure 12:
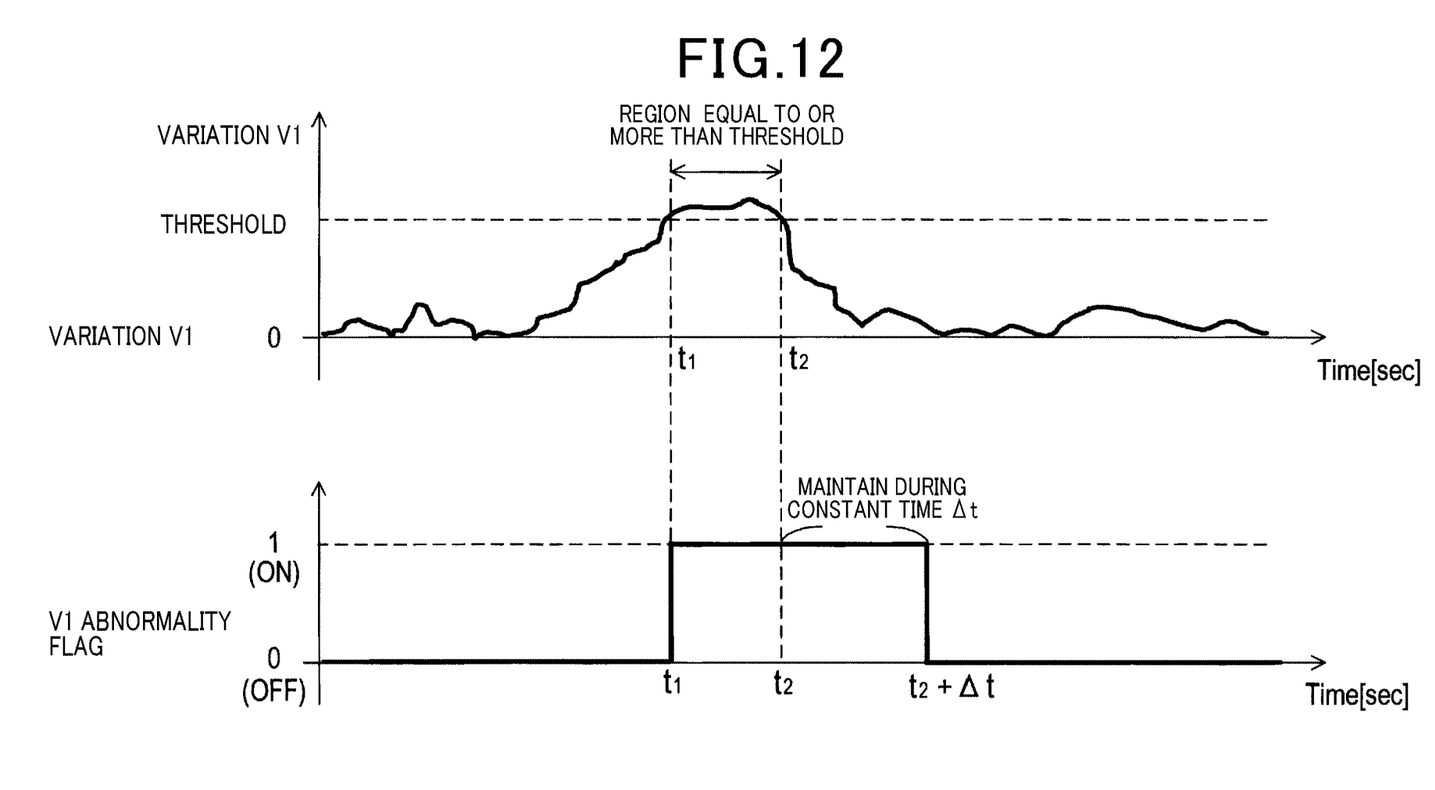
FIG. 12 is an explanatory diagram illustrating an example of the relationship between a variation v1 and a v1 abnormality flag.

FIG. 12 illustrates an example of the relationship between the variation v1 and the v1 abnormality flag. The variation v1 is equal to or more than the threshold Tv1 during the period from time t1 to time t2. The v1 abnormality flag is in the on state during the period from the time t1 to the time t2 and the period from the time t2 to time (t2+Δt). At has a predetermined time length. Note that the relationship between the variation v2 and a corresponding abnormality flag and the relationship between the variation v3 and a corresponding abnormality flag, which are described later, are substantially identical to the relationship between the variation v1 and the v1 abnormality flag.

Figure 6:
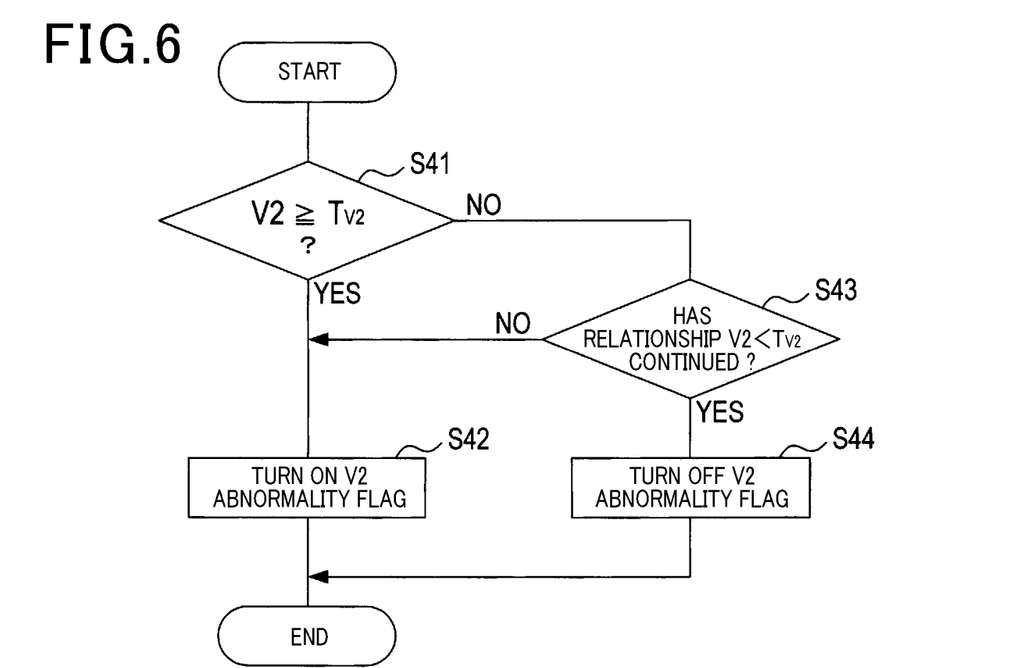
FIG. 6 is a flowchart illustrating a second abnormality determination subroutine carried out by the lane departure avoidance system illustrated in FIG. 1.

Returning to FIG. 4, in step S22, the determination unit 11 performs a second abnormality determination subroutine illustrated in FIG. 6.

In step S41 of FIG. 6, the determination unit 11 determines whether the variation v2 is equal to or more than a predetermined threshold Tv2. Upon determination that the variation v2 is equal to or more than the threshold Tv2, the second abnormality determination subroutine proceeds to step S42. Otherwise, upon determination that the variation v2 is less than the threshold Tv2, the second abnormality determination subroutine proceeds to step S43.

In step S42, the determination unit 11 turns on a v2 abnormality flag. Note that the v2 abnormality flag is a variable indicative of, for example, whether there is an abnormality in the variation v2, and an initial value of the v2 abnormality flag is set to the off state. If the v2 abnormality flag has been on, the determination unit 11 maintains the v2 abnormality flag in the on state.

Upon negative determination in step S41, the determination unit 11 determines whether the state where the variation v2 is less than the threshold Tv2 has continued for a predetermined time and over in step S43. Upon determination that the state where the variation v2 is less than the threshold Tv2 has continued for the predetermined time and over, the second abnormality determination subroutine proceeds to step S44. Otherwise, upon determination that the state where the variation v2 is less than the threshold Tv2 has not continued for the predetermined time and over, the second abnormality determination subroutine proceeds to step S42.

In step S44, the determination unit 11 turns off the v2 abnormality flag. If the v2 abnormality flag has been off, the determination unit 11 maintains the v2 abnormality flag in the off state.

Figure 7:
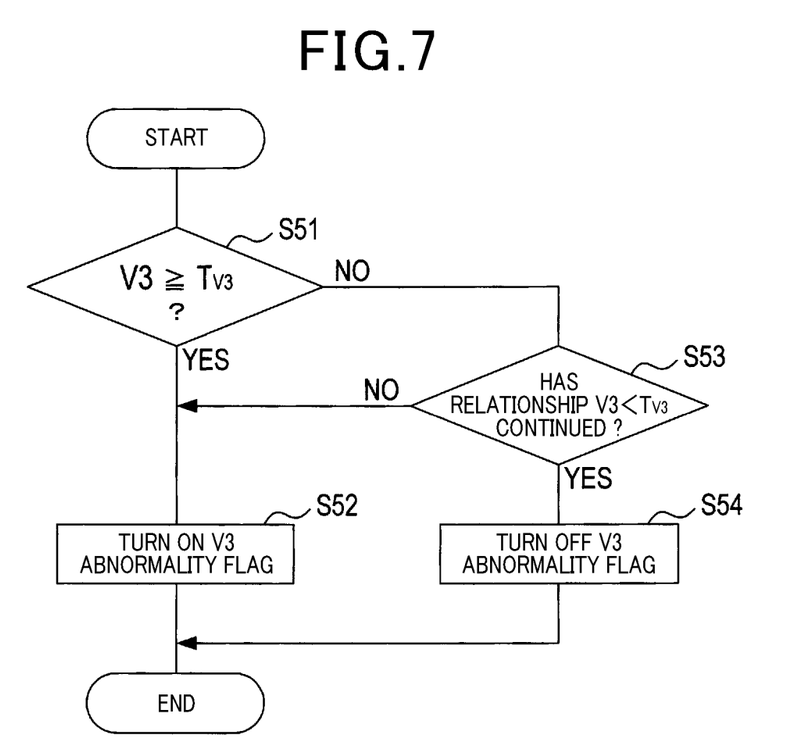
FIG. 7 is a flowchart illustrating a third abnormality determination subroutine carried out by the lane departure avoidance system illustrated in FIG. 1.

Returning to FIG. 4, in step S23, the determination unit 11 performs a third abnormality determination subroutine illustrated in FIG. 7.

In step S51 of FIG. 7, the determination unit 11 determines whether the variation v3 is equal to or more than a predetermined threshold Tv3. Upon determination that the variation v3 is equal to or more than the threshold Tv3, the third abnormality determination subroutine proceeds to step S52. Otherwise, upon determination that the variation v3 is less than the threshold Tv3, the third abnormality determination subroutine proceeds to step S53.

In step S52, the determination unit 11 turns on a v3 abnormality flag. Note that the v3 abnormality flag is a variable indicative of, for example, whether there is an abnormality in the variation v3, and an initial value of the v3 abnormality flag is set to the off state. If the v3 abnormality flag has been on, the determination unit 11 maintains the v3 abnormality flag in the on state.

Upon negative determination in step S51, the determination unit 11 determines whether the state where the variation v3 is less than the threshold Tv3 has continued for a predetermined time and over in step S53. Upon determination that the state where the variation v3 is less than the threshold Tv3 has continued for the predetermined time and over, the third abnormality determination subroutine proceeds to step S54. Otherwise, upon determination that the state where the variation v3 is less than the threshold Tv3 has not continued for the predetermined time and over, the third abnormality determination subroutine proceeds to step S52.

In step S54, the determination unit 11 turns off the v3 abnormality flag. If the v3 abnormality flag was already off, the determination unit 11 maintains the v3 abnormality flag in the off state.

Figure 8:
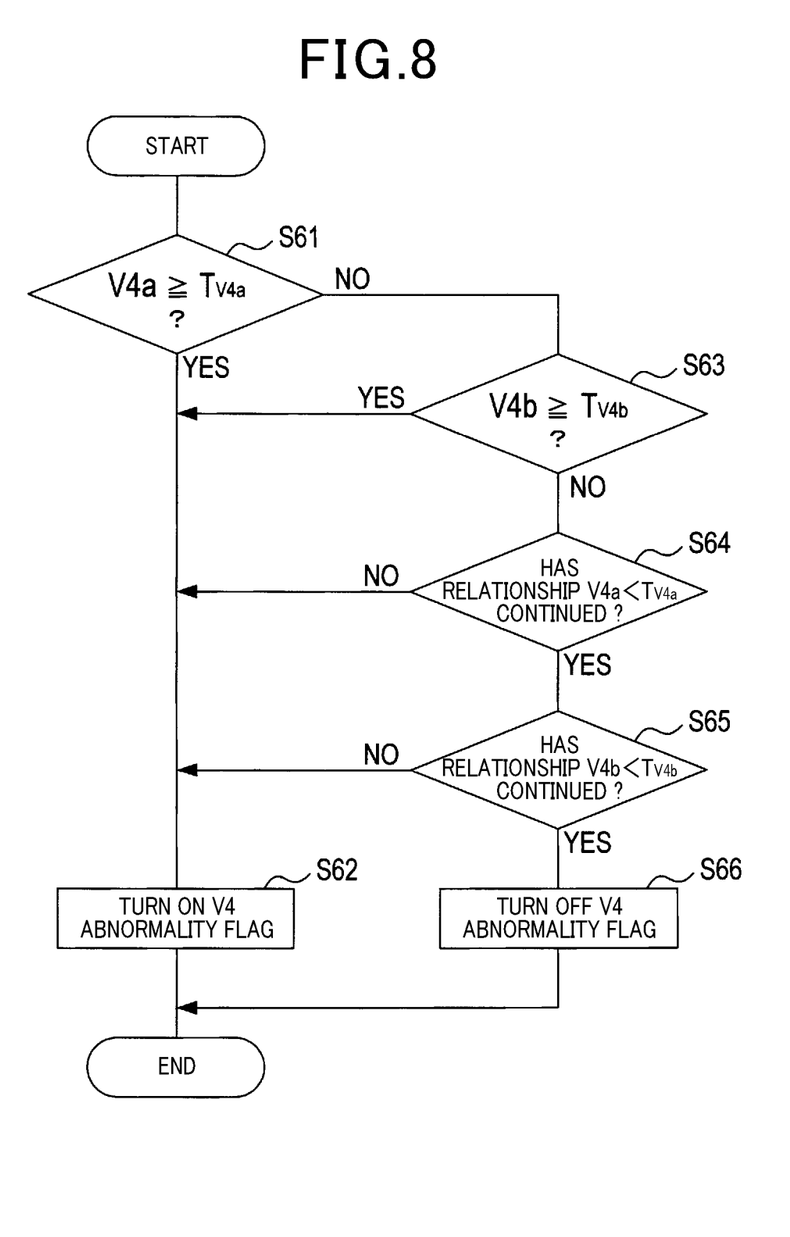
FIG. 8 is a flowchart illustrating a fourth abnormality determination subroutine carried out by the lane departure avoidance system illustrated in FIG. 1.

Returning to FIG. 4, in step S24, the determination unit 11 performs a fourth abnormality determination subroutine illustrated in FIG. 8.

In step S61 of FIG. 8, the determination unit 11 determines whether the variation v4a is equal to or more than a predetermined threshold Tv4a. Upon determination that the variation v4a is equal to or more than the threshold Tv4a, the fourth abnormality determination subroutine proceeds to step S62. Otherwise, upon determination that the variation v4a is less than the threshold Tv4a, the fourth abnormality determination subroutine proceeds to step S63.

In step S62, the determination unit 11 turns on a v4 abnormality flag. Note that the v4 abnormality flag is a variable indicative of, for example, whether there is an abnormality in the variation v4, and an initial value of the v4 abnormality flag is set to the off state. If the v4 abnormality flag has been on, the determination unit 11 maintains the v4 abnormality flag in the on state.

In step S63, the determination unit 11 determines whether the variation v4b is equal to or more than a predetermined threshold Tv4b. Upon determination that the variation v4b is equal to or more than the threshold Tv4b, the fourth abnormality determination subroutine proceeds to step S62. Otherwise, upon determination that the variation v4b is less than the threshold Tv4b, the fourth abnormality determination subroutine proceeds to step S64.

In step S64, the determination unit 11 determines whether the state where the variation v4a is less than the threshold Tv4a has continued for a predetermined time and over. Upon determination that the state where the variation v4a is less than the threshold Tv4a has continued for the predetermined time and over, the fourth abnormality determination subroutine proceeds to step S65. Otherwise, upon determination that the state where the variation v4a is less than the threshold Tv4a has not continued for the predetermined time and over, the fourth abnormality determination subroutine proceeds to step S62.

In step S65, the determination unit 11 determines whether the state where the variation v4b is less than the threshold Tv4b has continued for a predetermined time and over. Upon determination that the state where the variation v4b is less than the threshold Tv4b has continued for the predetermined time and over, the fourth abnormality determination subroutine proceeds to step S66. Otherwise, upon determination that the state where the variation v4b is less than the threshold Tv4b has not continued for the predetermined time and over, the fourth abnormality determination subroutine proceeds to step S62.

In step S66, the determination unit 11 turns off the v4b abnormality flag. If the v4b abnormality flag has been off, the determination unit 11 maintains the v4b abnormality flag in the off state.

Figure 13:
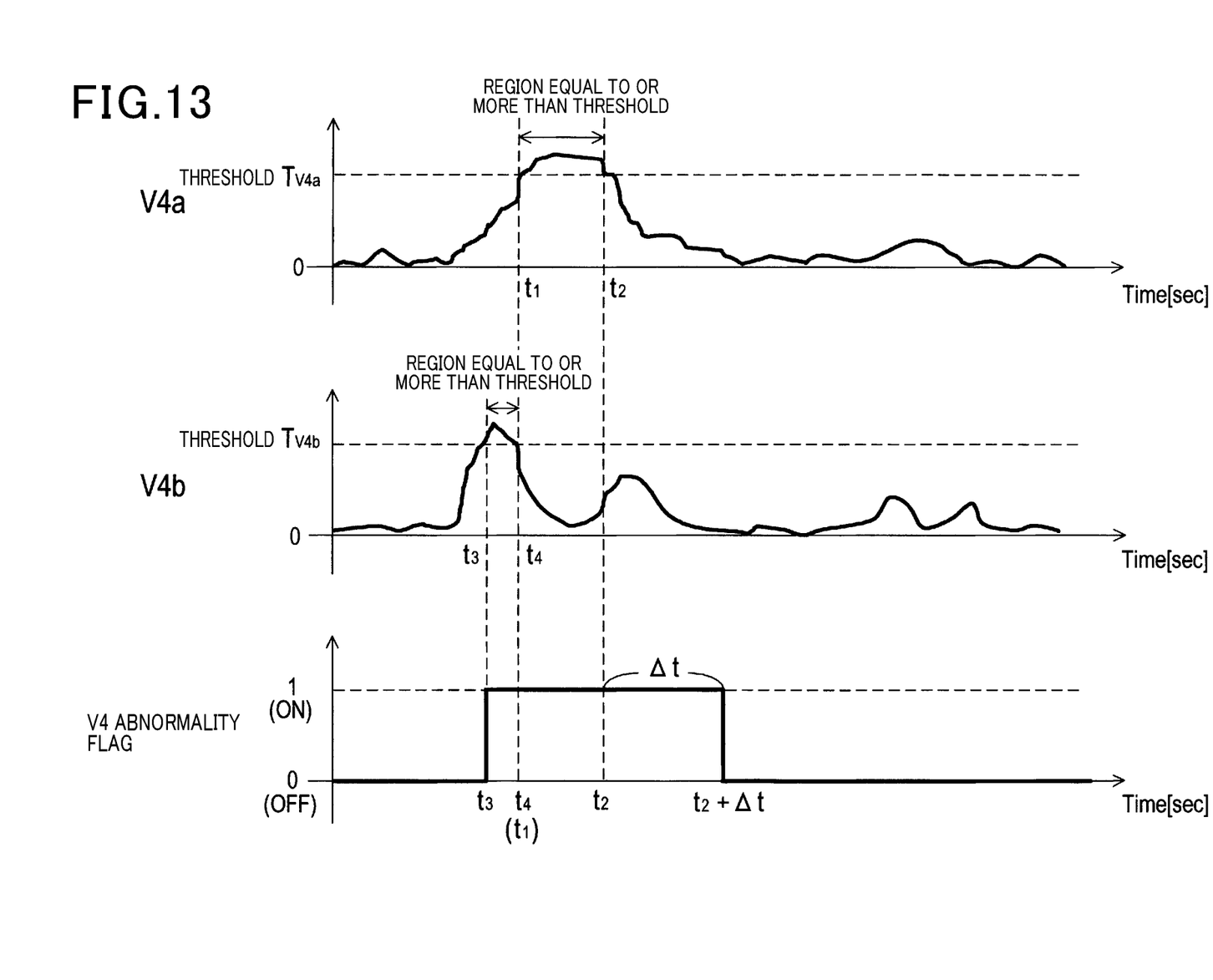
FIG. 13 is an explanatory diagram illustrating an example of the relationship between variations v4a and v4b and a v4 abnormality flag.

FIG. 13 illustrates an example of the relationship between each of the variations v4a and v4b and the v4 abnormality flag. The variation v4a is equal to or more than the threshold Tv4a during the period from time t1 to time t2. The variation v4b is equal to or more than the threshold Tv4b during the period from time t3 to time t4. The times t1, t2, t3, and t4 satisfy the following relationship:

$$t3<t1=t4<t2.$$

The v4 abnormality flag is in the on state during the period from the time t3 to the time t2 and the period from the time t2 to time (t2+$\Delta$t). $\Delta$t has a predetermined time length. The period from the time t3 to the time t2 represents a period during which any one of the variation v4a and the variation v4b is equal to or more than the corresponding threshold. The period from the time t2 to the time (t2+$\Delta$t) represents a period from the time t2 at which all the values of the variations v4a and v4b become less than the corresponding threshold as a start point to the time at which the predetermined time length has elapsed since the start point t2.

Returning to FIG. 4, in step S25, the determination unit 11 determines whether at least one of the v1 abnormality flag to the v4 abnormality flag v4 is in the on state. Upon determination that at least one of the v1 abnormality flag to the v4 abnormality flag v4 is in the on state, the determination routine proceeds to step S26. Otherwise, upon determination that all the v1 abnormality flag to the v4 abnormality flag v4 are in the off state, the determination routine proceeds to step S27.

In step S26, the determination unit 11 turns on a control restriction flag. Note that the control flag is a variable indicative of, for example, whether to restrict the steering control, and an initial value of the control restriction flag is set to the off state. If the control restriction abnormality flag has been on, the determination unit 11 maintains the control flag in the on state.

Returning to FIG. 2, in step S6, the control restriction unit 13 determines whether the control restriction flag is in the on state. Upon determination that the control restriction flag is in the off state, the lane departure avoidance routine proceeds to step S7. Otherwise, upon determination that the control restriction flag is in the on state, the lane departure avoidance routine proceeds to step S12.

In step S7, the control execution unit 15 determines whether a control execution flag is in the on state. Note that the control execution flag is a variable indicative of, for example, whether to execute the steering control, and an initial value of the control execution flag is set to the on state. Upon determination that the control execution flag is in the off state, the lane departure avoidance routine proceeds to step S8. Otherwise, upon determination that the control execution flag is in the on state, the lane departure avoidance routine proceeds to step S10.

In step S8, the control execution unit 15 performs a control start determination routine of whether to start the steering control. The following describes the control start determination routine with reference to FIG. 9.

Figure 9:
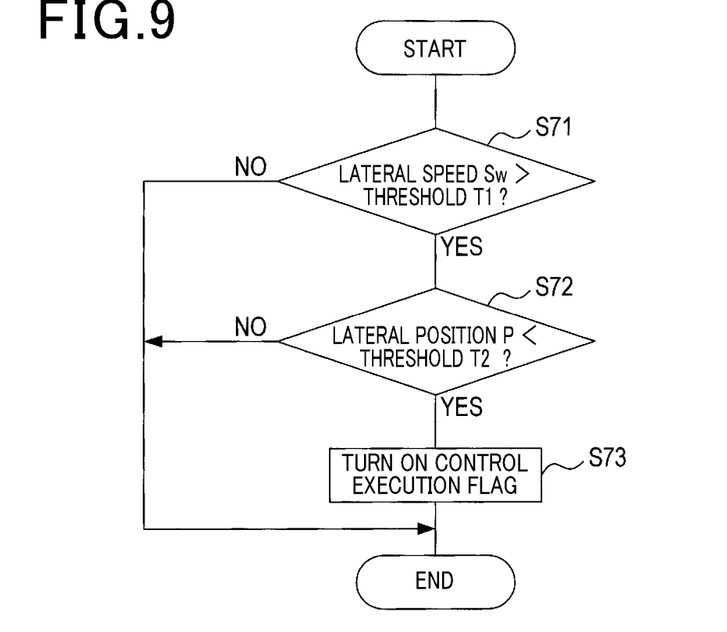
FIG. 9 is a flowchart illustrating a control start determination routine carried out by the lane departure avoidance system illustrated in FIG. 1.

In step S71 of FIG. 9, the control execution unit 15 determines whether the lateral speed Sw is higher than a predetermined threshold T1.

Upon determination that the lateral speed Sw is higher than the predetermined threshold T1, the control start determination routine proceeds to step S72. Otherwise, upon determination that the lateral speed Sw is equal to or lower than the predetermined threshold T1, the control execution unit 15 terminates the control start determination routine.

In step S72, the control execution unit 15 determines whether the lateral position P of the own vehicle 31 is smaller than a predetermined threshold T2 (see FIG. 3). Upon determination that the lateral position P of the own vehicle 31 is smaller than the predetermined threshold T2, the control start determination routine proceeds to step S73. Otherwise, upon determination that the lateral position P of the own vehicle 31 is equal to or larger than the predetermined threshold T2, the control execution unit 15 terminates the control start determination routine.

In step S73, the control execution unit 15 turns on the control execution flag.

Returning to FIG. 2, in step S9, the control execution unit 15 determines whether the control execution flag is in the on state. Upon determination that the control execution flag is in the on state, the lane departure avoidance routine proceeds to step S10. Otherwise, upon determination that the control execution flag is in the off state, the control execution unit 15 terminates the lane departure avoidance routine.

In step S10, the control execution unit 15 performs a control running routine, i.e. a steering control routine. The following describes the steering control routine with reference to FIG. 10. The steering control routine is an example of a steering control task that steers the own vehicle in accordance with the position of the own vehicle relative to the lane marking lines toward a direction for avoiding departure of the own vehicle from the lane.

Figure 10:
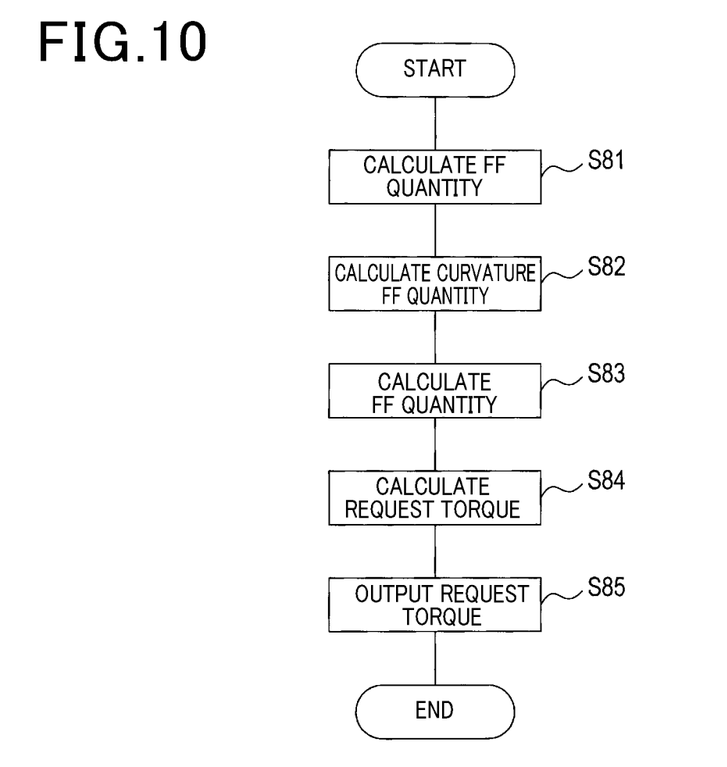
FIG. 10 is a flowchart illustrating a control running routine carried out by the lane departure avoidance system illustrated in FIG. 1.

In step S81 of FIG. 10, the control execution unit 15 sets target values for the respective lateral position P and the lateral speed Sw assuming that the lane on which the own vehicle 31 is travelling has a straight lane. The target value for the lateral position P is set to be greater than the threshold T2 and a threshold T3 described later. The target value for the lateral speed Sw is set such that the absolute value of the target value is sufficiently small value.

Next, the control execution unit 15 calculates request torque, i.e. a feedforward (FF) quantity, required to reach the target values for the lateral position P and the lateral speed Sw.

In step S82, the control execution unit 15 calculates request torque, i.e. a curvature feedforward quantity, required for the own vehicle 31 to travel based on the curvature C obtained in step S3.

In step S83, the control execution unit 15 calculates the deviation between the actual value and the target value of the lateral position P, and calculates the deviation between the actual value and the target value of the lateral speed Sw. Then, the control execution unit 15 calculates request torque, i.e. a feedback (FB) quantity, required to reduce the deviations.

In step S84, the control execution unit 15 calculates the sum of the feedforward quantity calculated in step S81, the curvature feedforward quantity calculated in step S82, and the feedback quantity calculated in step S83 to thereby calculate final request torque.

In step S85, the control execution unit 15 outputs the request torque calculated in step S84 to the electrical power steering apparatus 25.

Returning to FIG. 2, in step S11, the control execution unit 15 performs a control termination determination routine of whether to terminate the steering control. The following describes the control termination determination routine with reference to FIG. 11.

Figure 11:
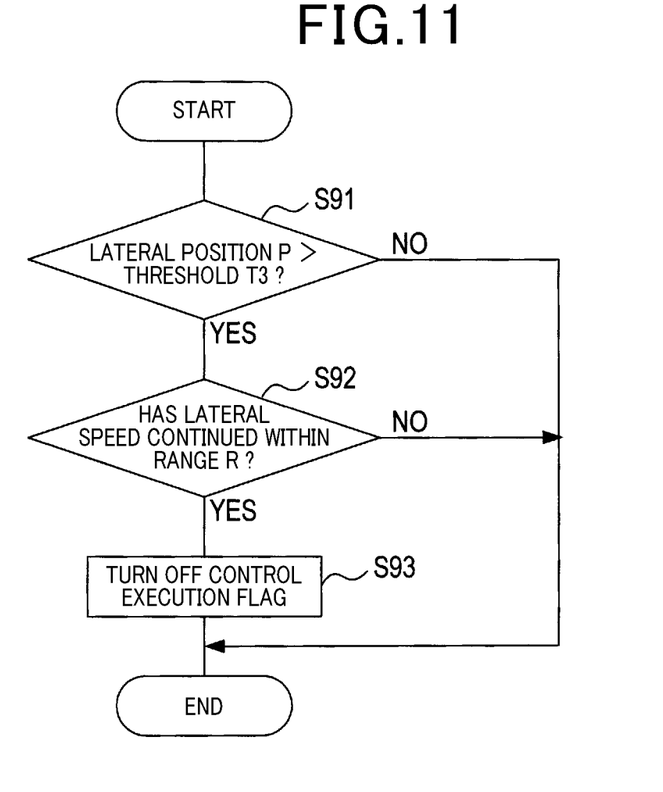
FIG. 11 is a flowchart illustrating a control termination determination routine carried out by the lane departure avoidance system illustrated in FIG. 1.

In step S91 of FIG. 11, the control execution unit 15 determines whether the lateral position P is greater than a predetermined threshold T3.

Upon determination that the lateral position P is greater than the predetermined threshold T3, the control termination determination routine proceeds to step S92. Otherwise, upon determination that the lateral position P is equal to or smaller than the predetermined threshold T3, the control execution unit 15 terminates the control termination determination routine.

In step S92, the control execution unit 15 determines whether the lateral speed Sw has continued within a predetermined range R for a predetermined period. Upon determination that the lateral speed Sw has continued within the predetermined range R for the predetermined period, the control termination determination routine proceeds to step S93. Otherwise, upon determination that the lateral speed Sw has not continued within the predetermined range R for the predetermined period, the control execution unit 15 terminates the control termination determination routine.

In step S93, the control execution unit 15 turns off the control execution flag.

Returning to FIG. 2, upon affirmative determination in step S6, the control restriction unit 13 turns off the control execution flag in step S12. If the control execution flag has been off, the control execution unit 15 maintains the control execution flag in the off state.

3. Advantageous Effect Obtained by Lane Departure Avoidance System

If one of the variation v1, v2, v3, v4a, and v4b is equal to or more than a corresponding threshold, the recognized result of the lane marking lines are unreliable. Because the request torque is carried out based on the recognized result of the lane marking lines, if the request torque were calculated while the recognized result of the lane marking lines are unreliable, the calculated request torque would become unreliable. This would result in the steering control being unstable.

From this viewpoint, the lane departure avoidance system 1 is configured to turn on the control restriction flag if one of the variation v1, v2, v3, v4a, and v4b is equal to or more than the corresponding threshold. This setting of the control restriction flag to the on state enables the determination in step S6 to be affirmative, so that the lane departure avoidance routine proceeds to step S12. This prevents execution of the control running routine, i.e. the steering control routine, described in step S10.

If the on timing of the control prediction flag is earlier than the start of the steering control routine, execution of the steering control task is disabled. Otherwise, if the on timing of the control prediction flag is during execution of the steering control routine, the steering control task is terminated at the corresponding on timing of the control prediction flag.

Specifically, the lane departure avoidance system 1 disables start of the steering control routine or terminates the running steering control routine if one of the variation v1, v2, v3, v4a, and v4b is equal to or more than the corresponding threshold. This enables execution of unstable steering control to be avoided or restricted.

That is, the lane departure avoidance system 1 calculates the variations v1, v2, v3, v4a, and v4b, and disables start of the steering control routine or terminates the running steering control routine if any one of the variations v1, v2, v3, v4a, and v4b is equal to or more than the corresponding threshold. This enables the steering control to be further stable.

Until a predetermined length of time has elapsed since any one of the variations v1, v2, v3, v4a, and v4b became lower than the corresponding threshold, the lane departure avoidance system 1 maintains the corresponding abnormality flag in the on state.

This enables the departure avoidance system 1 to disable start of the steering control routine or terminate the running steering control routine during 1. The period for which any one of the variations v1, v2, v3, v4a, and v4b is equal to or more than the corresponding threshold
2. The period until which the predetermined length of time has elapsed since any one of the variations v1, v2, v3, v4a, and v4b became lower than the corresponding threshold The present embodiment of the present invention has been described, but the present invention is not limited to the above present embodiment and can be modified to have various configurations.

A part of the variations v1, v2, v3, v4a, and v4b can be used for control restriction determination. Other variations in addition to the variations v1, v2, v3, v4a, and v4b can be used for control restriction determination. A part of or all of the variations v1, v2, v3, v4a, and v4b for control restriction determination can be replaced with other variations.

Each of the variations v1, v2, v3, v4a, and v4b can be calculated by another method other than the above described method.

For example, the variation calculating unit 9 can calculate an absolute value of the difference between a newest calculated value of a parameter, which is any one of the lateral position P, the yaw angle $\theta$, the curvature C, and the pitch angle $\Phi$, and a most recent previous calculated value of the corresponding parameter, and can use the absolute value as a variation of the corresponding parameter.

The lane departure avoidance system 1 disables start of the steering control routine upon the control restriction flag being on, but can continuously perform the running steering control routine. The lane departure avoidance system 1 can terminate the running steering control routine without disabling start of the next steering control routine.

The lane departure avoidance system 1 can turn off the control restriction flag immediately when all the variations v1, v2, v3, v4a, and v4b become lower than the respective thresholds without waiting for the lapse of a predetermined length of time. Specifically, the lane departure avoidance system 1 can be modified to turn off the corresponding abnormality flags when all the variations v1, v2, v3, v4a, and v4b become lower than the respective thresholds.

The lane departure avoidance system 1 can be configured to turn on or hold on the control restriction flag when the number of the v1 abnormality flag to v4 abnormality flag being in the on state is equal to or more than a predetermined number, such as 2, 3, or 4, and turn off or hold off the control restriction flag when the number of the v1 abnormality flag to v4 abnormality flag being in the on state is less than the predetermined number.

The functions of one element in the present embodiment can be distributed as plural elements, and the functions that plural elements have can be combined into one element. At least part of the structure of the present embodiment can be replaced with a known structure having the same function as the at least part of the structure of the present embodiment. A part of the structure of the present embodiment can be eliminated. At least part of the structure of the present embodiment can be added to or replaced with the structure of another part of the present embodiment. All aspects included in the technological ideas specified by the language employed by the claims constitute embodiments of the present invention.

The present invention can be implemented by various embodiments in addition to the lane departure avoidance system; the various embodiments include systems each including the lane departure avoidance system, programs for serving a computer as the lane departure avoidance system, storage media storing the programs, and lane departure avoidance methods.

Note that this application is based on and claims the benefit of priority from Japanese Patent Application No. 2015-130161, the disclosure of which is incorporated in its entirety herein by reference.

REFERENCE SIGNS LIST

1 Lane departure avoidance system,
3 Sensor value obtaining unit
5 Recognition unit
7 Parameter calculating unit
9 Variation calculating unit
11 Determination unit
13 Control restriction unit
15 Control execution unit 17 Image sensor
19 Yaw-rate sensor
21 Wheel speed sensor
23 Other sensors
25 Electric power steering apparatus
27, 29 Lane marking line
31 Own vehicle
33 Lane

The invention claimed is:

1. A lane departure avoidance system comprising:
an image obtaining unit configured to obtain a captured image of a forward region ahead of an own vehicle;
a recognition unit configured to recognize lane marking lines in the captured image;
a control execution unit configured to execute, based on a position of the own vehicle relative to the lane marking lines recognized by the recognition unit, steering control to thereby steer the own vehicle toward a direction for avoiding departure of the own vehicle from a lane, the control execution unit is configured to execute the steering control when a control execution flag is set to an on state and not execute the steering control when the control execution flag is set to an off state;
a calculation unit configured to calculate and select a third variation and at least one of a first variation, a second variation and a fourth variation,
the first variation comprising a variation between points in time of a lateral position of the own vehicle relative to the recognized lane marking lines,
the second variation comprising a variation between points in time of a yaw angle of the own vehicle, the yaw angle representing an angle formed by a travelling direction of the own vehicle relative to the recognized lane marking lines,
the third variation comprising a variation between points in time of a curvature of the recognized lane marking lines, and
the fourth variation comprising a variation between points in time of a pitch angle of the own vehicle;
a determination unit configured to determine whether the third variation and the at least one of the first variation, the second variation and the fourth variation are equal to or more than their corresponding threshold values; and
a control restriction unit configured to turn on a restriction control flag which causes the control restriction unit to turn the control execution flag to the off state in response to a determination that at least one value of the third variation and at least one value of the first variation, the second variation and the fourth variation is equal to or more than its corresponding threshold value.

2. The lane departure avoidance system according to claim 1, wherein:
the control restriction unit is configured to set an abnormality flag to an on state in response to an abnormality in at least one of the first variation, the second variation, the third variation, and the fourth variation, and
the control restriction unit is configured to maintain the abnormality flag in the off state until a predetermined time length has elapsed since any one of values of the at least one of the first variation, the second variation, the third variation, and the fourth variation has become lower than its corresponding threshold value.

3. The lane departure avoidance system according to claim 2, wherein:
the control restriction unit is configured to maintain the abnormality flag in the off state until a predetermined time length has elapsed since values of all of the at least one of the first variation, the second variation, the third variation, and the fourth variation have become lower than its corresponding threshold value.

4. The lane departure avoidance system according to claim 1, wherein:
the control execution unit is configured to execute the steering control to thereby output request torque to a power steering apparatus.

5. The lane departure avoidance system according to claim 4, wherein:
the control execution unit is configured to disable, in response to the control execution flag being in the off state, the output of the request torque to the power steering apparatus or terminate the outputted request torque to the power steering apparatus.

* * * * *